United States Patent
Trenkle et al.

(10) Patent No.: US 11,225,314 B2
(45) Date of Patent: Jan. 18, 2022

(54) ACTUATOR SYSTEM IN AN AIRCRAFT FOR MONITORING A NO-BACK BRAKE

(71) Applicant: LIEBHERR-AEROSPACE LINDENBERG GMBH, Lindenberg (DE)

(72) Inventors: Christian Trenkle, Weiler (DE); Bernd Schievelbusch, Lindenberg (DE); Stefan Hoechstoetter, Roethenbach (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 176 days.

(21) Appl. No.: 16/842,796

(22) Filed: Apr. 8, 2020

(65) Prior Publication Data
US 2020/0324872 A1    Oct. 15, 2020

(30) Foreign Application Priority Data
Apr. 9, 2019   (DE) .................... 10 2019 109 330.9

(51) Int. Cl.
*B64C 3/38*   (2006.01)
*B64C 5/08*   (2006.01)
(Continued)

(52) U.S. Cl.
CPC .............. *B64C 3/38* (2013.01); *B64C 5/08* (2013.01); *B64C 9/38* (2013.01); *B64D 41/00* (2013.01); *B64D 45/0005* (2013.01); *B64C 9/323* (2013.01)

(58) Field of Classification Search
CPC .... B64C 3/38; B64C 5/08; B64C 9/38; B64C 9/323; B64C 9/22; B64C 13/28; B64C 9/16; B64D 41/00; B64D 45/0005
See application file for complete search history.

(56) References Cited

U.S. PATENT DOCUMENTS

| | | | |
|---|---|---|---|
| 6,824,099 B1 * | 11/2004 | Jones | B64C 13/28 244/99.12 |
| 10,081,419 B2 * | 9/2018 | Jones | B64C 9/14 |

(Continued)

FOREIGN PATENT DOCUMENTS

| | | |
|---|---|---|
| DE | 102014202735 A1 | 8/2014 |
| DE | 102013206061 A1 | 10/2014 |

(Continued)

OTHER PUBLICATIONS

Search Report issued in corresponding German Patent Application No. 10 2019 109 330.9 dated Dec. 16, 2019 (7 pages).

*Primary Examiner* — Valentina Xavier
(74) *Attorney, Agent, or Firm* — Kilyk & Bowersox, P.L.L.C.

(57) ABSTRACT

The present invention relates to an actuator system in an aircraft for monitoring a no-back brake, which system comprises an actuator for actuating a flap of a flight control system of the aircraft, a first torque sensor for detecting a torque on the drive side of the actuator, and a second torque sensor for detecting a torque on the output side of the actuator, wherein the actuator is provided with an auto-switching no-back brake to hold the flap actuated by the actuator in position. The actuator system further has a monitoring unit, which is connected to the first torque sensor and the second torque sensor and is designed to detect an acute or imminent fault condition of the no-back brake depending on an actuator state and the detected torque values of the first torque sensor and the second torque sensor.

14 Claims, 5 Drawing Sheets

Figure 1A:
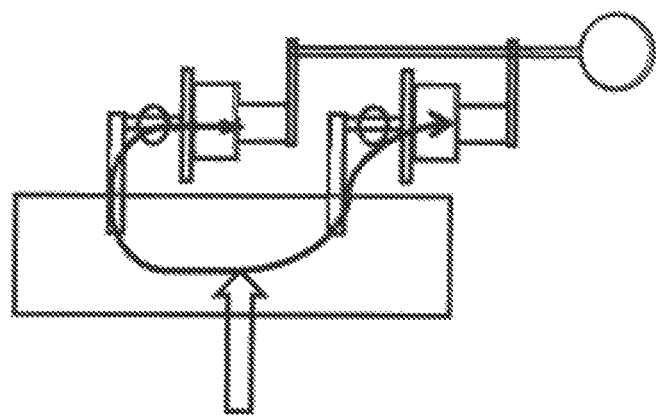

(51) Int. Cl.
  *B64D 41/00* (2006.01)
  *B64D 45/00* (2006.01)
  *B64C 9/38* (2006.01)
  *B64C 9/32* (2006.01)

(56) References Cited

U.S. PATENT DOCUMENTS

| | | | |
|---|---|---|---|
| 2010/0100355 A1* | 4/2010 | Marx | B64D 45/0005 |
| | | | 702/183 |
| 2011/0021307 A1* | 1/2011 | Davies | F16H 57/10 |
| | | | 475/254 |
| 2014/0230570 A1 | 8/2014 | Kapas et al. | |
| 2015/0076283 A1 | 3/2015 | Schievelbusch et al. | |
| 2020/0056688 A1* | 2/2020 | Barger | F16D 65/28 |
| 2020/0156766 A1* | 5/2020 | Tzabari | B64C 9/02 |
| 2020/0377063 A1* | 12/2020 | Gaile | B60T 1/062 |

FOREIGN PATENT DOCUMENTS

| | | |
|---|---|---|
| DE | 102013013340 A1 | 2/2015 |
| DE | 202017102174 U1 | 5/2017 |

\* cited by examiner

ACTUATOR SYSTEM IN AN AIRCRAFT FOR MONITORING A NO-BACK BRAKE

This application claims priority to German Patent Application No. 10 2019 109 330.9, filed Apr. 9, 2019.

The present invention relates to an actuator system in an aircraft for monitoring a no-back brake.

In aircraft such as planes, for example, it is often necessary for control purposes to generate certain aerodynamic flow conditions. This takes place typically via the extension or retraction of flaps.

In the majority of planes according to the current prior art, the function "move flaps" is thus performed by central drive units, the drive power of which is conducted by mechanical shaft systems to the drive stations of the high-lift flaps on the wings. For the function "hold flaps in position", two different system architectures are known, namely those which have brakes switched by means of secondary energy and those which are provided with auto-switching backstops and do not require any secondary energy. Auto-switching backstops of this kind are often also described by the English technical term "no-back brakes" or NBB for short.

In systems with actively switched brakes, automatic function tests are the prior art. For systems with auto-switching no-back brakes there has only been the option to date of a function check to be carried out manually at periodic intervals. Since the function of the no-back brake is relevant for safety, the inspection intervals must be relatively short.

A typical example of the actuation of flaps in an aircraft is the high-lift system of a plane. High-lift systems of fixed-wing aeroplanes fulfil two main functions, namely the controlled movement of the high-lift flaps and holding the high-lift flaps securely in position.

It is standard for the segments of the slats and flaps to be moved and held by two drive stations respectively acting in parallel. The drive stations can be executed both with spindles and with rotational drives. An implementation with rotational drives is described on the basis of FIGS. 1a and 1b.

A no-back brake is mounted at the input of each of these rotational drives. These no-back brakes hold the loads of a flap caused by the air load. If the high-lift system is not actively operated, the drive system between the central drive and the no-back brakes is virtually load-free, as depicted by the power arrow ending in the no-back brake in FIG. 1a.

Figure 1B:
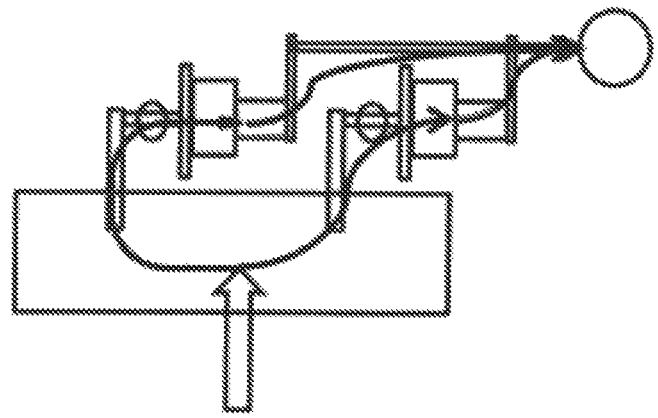

FIG. 1b, on the other hand, shows the operating state of the actuator for moving the flap. It is recognised that in such a state the force acting on the flap is conducted into the central drive, as during operation of the actuator the no-back brake cannot act.

In the case of a fault, thus a failure of a no-back brake, the twist of the flap body resulting therefrom is detected in the prior art using position sensors. However, this fault can remain unnoticed until the next manual function check, because the existing monitoring systems with position sensors only respond to twists that significantly exceed the twist angles occurring in normal flight.

Figure 2A:
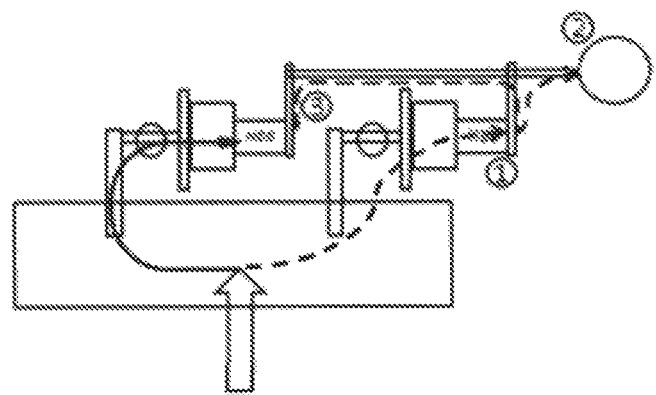
Figure 2B:
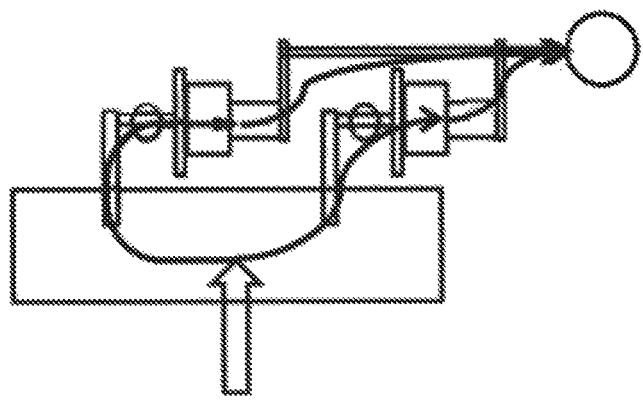

This situation can be inferred by way of example from FIGS. 2a and 2b. Here FIG. 2a shows the system at a standstill, wherein the right-hand no-back brake is not functioning, so that a force acting on the flap is not taken up there.

By contrast, FIG. 2b shows the case in which the system is in operation. Since the fault-free return linkage does not take up any force originating from the flap there either, there is no difference from FIG. 1b, in which both no-back brakes are in a functional state.

A high-lift system is known from DE 10 2017 002 053 A1 that is provided with torque sensors on the output side of the station actuators. The load signals of the sensors are processed in a computer unit, so that the faults "jamming" and "discontinuity" are detectable.

Another similar system is described e.g. in U.S. Pat. No. 9,764,853 B2. Systems of this architecture detect discontinuities of a load path, but cannot distinguish a malfunction of the no-back brake from a discontinuity in the load path.

In another prior art document, DE 10 2018 114 278.1, a method is described that puts loads at both actuators of a flap into a load ratio "R" and compares this with a predefined limit value. If the limit value is exceeded, a monitoring device is activated in a first step. If the load ratio "R" should lie within the limit value again when the system is restarted, a display is generated reporting a malfunction of the no-back brake.

Since the load proportions of the actuators of a flap are very different (e.g. 70% to 30%), faults in which the no-back brake of the actuator with the lower load fails are difficult to recognise, as they only represent a small proportion of the overall load ratio "R".

The detection of a no-back brake fault therefore requires a higher torque under load than the detection of the interrupted load path, which limits the sensitivity of a monitoring unit.

The object of the invention is to develop further a known high-lift system with auto-switching no-back brakes in such a way that automatic permanent monitoring of the function of the no-back brakes is possible.

This is achieved by an actuator system that has all the features of claim 1. Other advantageous configurations of the invention are cited in the dependent claims.

It is provided accordingly that for monitoring a no-back brake, the actuator system according to the invention in an aircraft comprises an actuator for actuating a flap of a flight control system of the aircraft, a first torque sensor for detecting a torque on the drive side of the actuator, and a second torque sensor for detecting a torque on the output side of the actuator, wherein the actuator is provided with an auto-switching no-back brake to hold in position a flap actuated by the actuator. Furthermore, the actuator system has a monitoring unit, which is connected to the first torque sensor and the second torque sensor and is designed to detect an acute or imminent fault condition of the no-back brake depending on an actuator state and the detected torque values of the first torque sensor and of the second torque sensor.

The further development consists therefore in the introduction of another torque sensor at the input or on the drive side of each actuator, and in the monitoring unit, which is designed to monitor and evaluate the signals of this sensor.

Auto-switching no-back brakes are activated by torques that act on the output side. They disengage when a drive torque acts on the drive side.

In the case of an opposite load direction (counter load) between drive and output, the no-back brake is released fully when the system is active. With the same load direction (sequential load) between drive and output, the no-back brake is partially disengaged when the system is active and then brakes the sequential load at the output so that the drive unit only has to apply a slight release torque.

In a system that provides torque measurement both at the actuator output and at the actuator input, a faulty no-back brake can be detected.

According to an optional development of the invention, it is provided that the monitoring unit is further designed to deduce a functioning no-back brake if no torque is present at the first torque sensor when the actuator is inactive, and to deduce a faulty no-back brake if a torque is present at both the first torque sensor and at the second torque sensor when the actuator is inactive.

These properties of the no-back brakes permit monitoring of their functional capacity in the operating states "stopped" and "operational".

If the system is stopped, a functioning no-back brake is deduced if no torque is present at the torque sensor at the actuator input (thus at the first torque sensor) when the drive is stopped and the no-back brake is functioning.

A non-functioning no-back brake is deduced, on the other hand, if a torque is present both at the actuator output and the actuator input when the drive is stopped. This state shows a malfunction of the no-back brake.

According to another advantageous modification of the present invention, it is provided that the monitoring unit is also designed to deduce a functioning no-back brake if a torque, which is below a predetermined first torque threshold and/or exceeds a predetermined second torque threshold, is present at the first torque sensor when the actuator is operating with a sequential load, and to deduce a faulty no-back brake if a torque proportional to the sequential load is present at the first torque sensor when the actuator is operating with a sequential load.

Monitoring of the no-back brake when an actuator is in operation is also termed dynamic monitoring.

A functioning no-back brake is deduced if a defined small torque, which is generated by a "drag brake" built into the no-back brake, is present at the torque sensor at the actuator input when the drive is operating with a sequential load and functional no-back brake. This torque is constant within limit values.

When the drive is operating under a counter load, on the other hand, a torque proportional to the load is present at the actuator input. This torque is variable and cannot be used for monitoring.

A non-functioning no-back brake is deduced if a torque proportional to the load is present at the torque sensor at the actuator input when the drive is operating with a sequential load and non-functioning no-back brake. This state shows a malfunction of the no-back brake.

When the drive is operating under a counter load and with a non-functioning no-back brake, a torque proportional to the load is present at the actuator input. This torque is variable and cannot be used for monitoring.

It can be provided here that the first torque threshold value is greater than the second torque threshold value, and that a torque value that is attributable to a drag brake provided in the no-back brake is preferably located between the two torque threshold values.

The principle according to the invention is not based on a load ratio "R" as is customary in the prior art. Each of the no-back brakes can be monitored individually. The detection of a load at the actuator input (or on the drive side of the actuator) is significantly more sensitive than in the prior art. This results in unambiguous detection of a malfunction of the no-back brake being guaranteed.

The monitoring unit can further be designed to store torque values in characteristic operating states for each operating cycle of the aircraft and to undertake analysis of these torque values collected over several operating cycles, preferably in order to determine a prognosis of an imminent fault condition of the no-back brake based on a trend.

Due to so-called trend monitoring (input torque during system operation decreasing with the number of system operations), early detection of degradation of the no-back brake function is possible. The functional states of the no-back brake described above (blocked at standstill, partially disengaged when operating under a sequential load, released during operation under counter load) enable observation of the behaviour over intervals of the aircraft operating cycles.

It can be provided in this case that the characteristic operating states comprise at least one of the following operating states:
a) Extension of a flap with the actuator before take-off of the aircraft with a low counter load,
b) Retraction of a flap with the actuator following take-off of the aircraft with a sequential load,
c) Extension of a flap with the actuator before landing of the aircraft with a counter load, and
d) Retraction of a flap with the actuator following landing of the aircraft with a low sequential load.

In each flight cycle the drives of the high-lift system experience identical operating states according to the pattern a)-d).

The operating states a) and b) each generate approximately identical torques at the input of each actuator in repeated execution.

Thus for operating state a) it is the case that this generates an approximately constant torque, which is composed of the friction torques of the flap mechanism and the torque of the "drag brake" built into the no-back brake. Any averaged value of this torque does not change in the observation interval.

For operating state b) it is the case that this has an approximately constant torque, which is generated by the "drag brake" built into the no-back brake. It may contain air load components depending on the structural implementation of the no-back brake. Any averaged value of this torque does not change in the observation interval.

It can accordingly be provided that the monitoring unit is further designed to average the torque values of the first torque sensor determined in a characteristic operating state and to use the averaged values for analysis over several operating cycles.

It is advantageously provided according to the invention that the monitoring unit is designed, in the case of an averaged torque value of the first torque sensor decreasing over several operating cycles in the operating state a), to detect a fault condition, in particular to detect a fault condition that indicates a deterioration in the braking capacity (gain) of a drag brake in the no-back brake.

It is namely possible to create trend analyses of the braking capacity of the no-back brake over an interval of several flight cycles from observation of these torques.

It can thus be provided that the monitoring unit is designed, in the case of an averaged torque value of the first torque sensor decreasing over several operating cycles in the operating state b), to detect a fault condition, in particular to detect a fault condition that indicates a deterioration in the braking capacity (gain) of the overall no-back brake.

According to an advantageous modification of the present invention, it can be provided that the monitoring unit is designed to prepare a prognosis of when a deterioration of the no-back brake passes a critical threshold on the basis of the torque values detected over several operating cycles.

It is preferably provided that the flight control system of the aircraft is a high-lift system, a tail plane trim system and/or a thrust reversal system.

Tail plane trim systems likewise fulfil two main functions, the controlled movement of the tail plane and securely holding the tail plane in position. Tail plane trim systems with a no-back brake as a position-holding element usually have only one—also redundantly executed—load path. In the prior art, a faulty no-back brake can be detected by monitoring the fin position. In tail plane trim systems the drive energy of the drive motors is transmitted to the adjustable tail plane via linkages and reduction gears and spindle nut units.

The function "hold fin in position" can be executed here also by actively switched brakes or auto-switching no-back brakes. The monitoring method described can therefore be similarly used for tail plane trim systems also.

This type of monitoring can also be deployed in thrust reversal systems.

Furthermore, the aircraft can be a plane.

The invention also relates to a method for monitoring a no-back brake of an actuator system in an aircraft according to any one of the preceding claims.

According to an optional further development of the method, it can be provided that the data of the torque values of the first torque sensor and of the second torque sensor are stored by the monitoring unit, and are only read on completion of an operating cycle, preferably as part of ground servicing, the so-called ground check.

The advantages of the implementation according to the invention consist in a cost-saving additional monitoring function. Furthermore, the safety of the system is improved because the interval between occurrence of the fault and its detection is shortened. The servicing effort following the occurrence of a fault is reduced, as the fault cause can be associated clearly with one component. The monitoring according to the invention enables servicing action to be planned at an early stage by means of trend analysis.

It is possible using the system according to the invention to detect three fault types using just one system: discontinuity, jamming and no-back brake fault.

Figure 3:
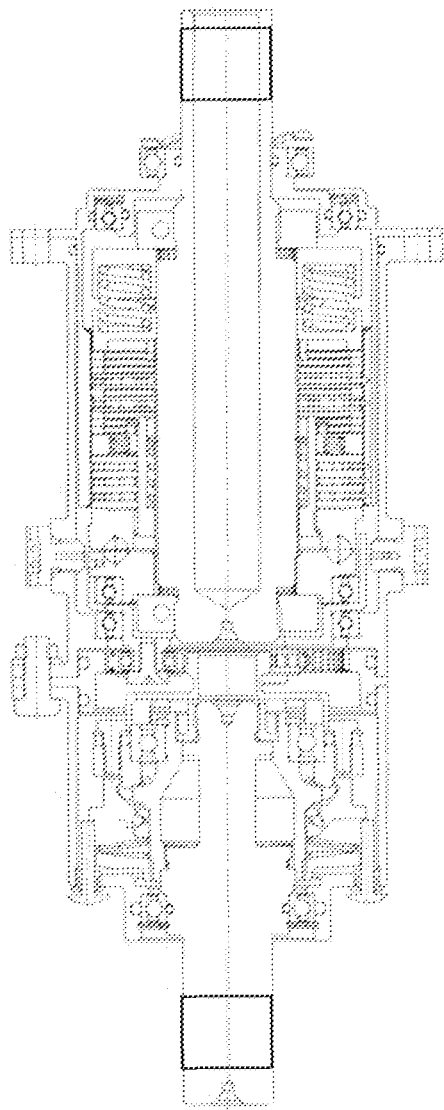
Figure 4:
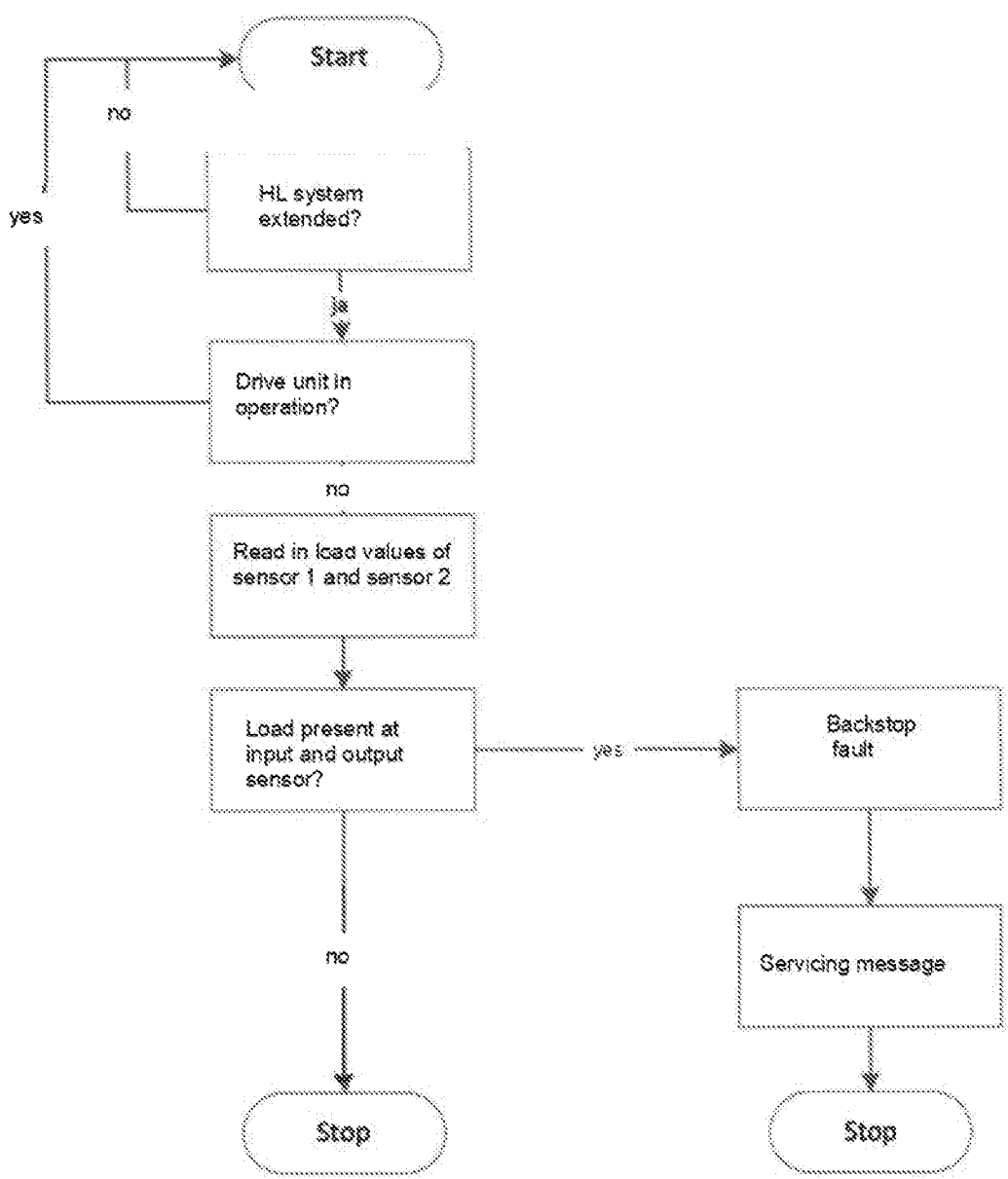
Figure 5:
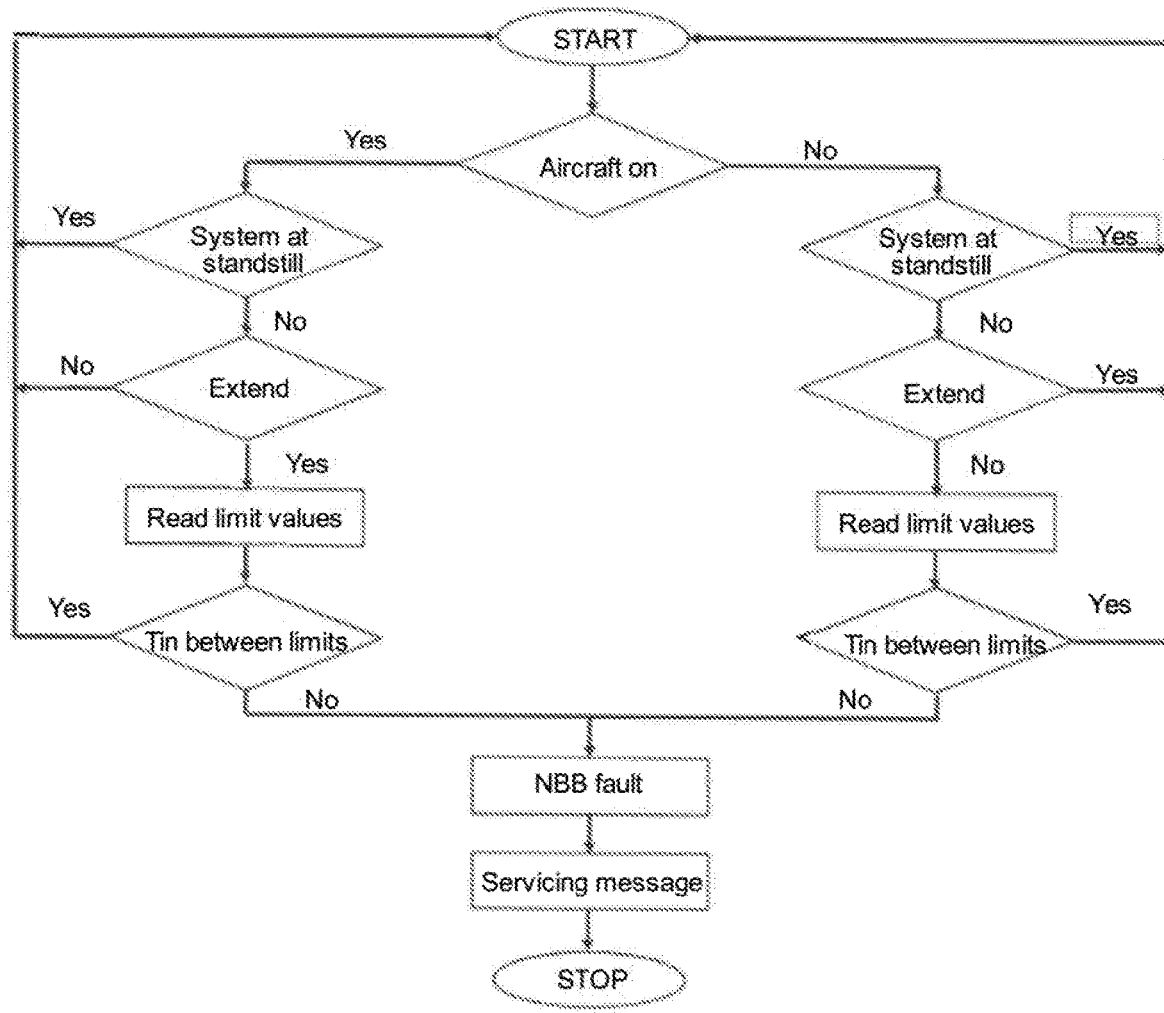

Further details, features and advantages are apparent from the following description of the figures. These show:

FIGS. 1a and 1b: a conventional actuator system at standstill and in operation with a functioning no-back brake, FIGS. 2a and 2b: a conventional actuator system at standstill and in operation with a non-functioning no-back brake, FIG. 3: a sectional view of an actuator according to the invention, FIG. 4: a flow chart for monitoring the actuator system at standstill, and FIG. 5: a flow chart for monitoring the actuator system in operation.

FIGS. 1a and 1b show a conventional actuator system at standstill as well as in operation with a functioning no-back brake.

In FIG. 1a a flap 4 is visible, for example a slat or flap segment, which is moved and held by two actuators 3 acting respectively in parallel. Arranged at the input of each actuator 3 is a no-back brake 2, which holds the loads of a flap caused by the air, for example. The central drive 7 is connected here to the several actuators 3 for actuating the flap 4.

In a state in which the flap 4 is not actively moved, virtually no load is present between the central drive 7 and the respective no-back brakes 2. In FIG. 1a this is depicted by the arrows ending in the actuator, which symbolise that the torque induced there by the flap 4 due to air load is not led further in the direction of the central drive 7. In such a state, in which none of the actuators is operated, the no-back brake 2 acts and prevents a transmission of a torque to drive components further upstream.

FIG. 1b, on the other hand, shows an actuator system which is actively moving the flap 4. The no-back brake is therefore in a decoupled state, so that torques induced by air load onto the flap 4 are conducted via the actuator as far as the central drive 7.

FIGS. 2a and 2b show a conventional system with a functioning no-back brake 2.

It is usual in the prior art to determine this failure by a twist in the flap 4. FIG. 2a shows a defective no-back brake in the right-hand section of the flap 4, for example, so that a torque acting on the flap 4 by means of air load is led via the right actuator and the central drive 7 to the left, still functioning actuator.

FIG. 2b shows an operating state of the arrangement from FIG. 2a with the non-functioning no-back brake in the right-hand flap section. No difference can be detected there compared with FIG. 1b.

FIG. 3 now shows an implementation according to the invention of the claimed actuator system 1, in which the actuator 3 is provided with a torque sensor 5 on the drive side and a torque sensor 6 on the output side.

It is thereby possible with the aid of a monitoring unit to detect a non-functioning no-back brake more reliably than in the prior art.

FIG. 4 shows a flow chart in the case of a high-lift system used by way of example for detecting a fault condition of the no-back brake, which chart is preferably executed with the aid of a monitoring unit. In this case the present monitoring is carried out in a state in which the actuator is not in operation; the monitoring can accordingly be described as "static".

It is checked at the beginning whether the high-lift system (abbreviation: HL) is extended or not. If this should not be the case, the check is continued until the high-lift system is in an extended state.

If the high-lift system is extended, on the other hand, it is checked whether the at least one drive unit is in operation or not. If the at least one drive unit is in operation, the preceding interrogations are performed again.

If the drive unit is not in operation, however, the next steps of the static monitoring can be performed. The torque values of the first torque sensor and the second torque sensor are then read in and checked for whether a load is present at the input sensor (first torque sensor) and at the output sensor (second torque sensor). If no load is detected here from both sensors, it is deduced that there are no irregularities in the no-back brake and the check comes to an end.

Otherwise, thus if a load is present both at the input sensor (first torque sensor) and at the output sensor (second torque sensor), or a torque above a certain threshold value is detectable, a fault in the no-back brake is deduced, so that a servicing message or other message is output before the test ends.

FIG. 5 shows a flow chart for an actuator system that is in operation.

It is examined initially whether the aircraft or plane is on the ground or in the air.

If it is on the ground and if the actuator system is extended, then the torque values are read in and checked for whether these lie within predetermined limits. If this is not the case, a fault in the no-back brake is deduced, so that a servicing message or another message can be output before the test ends.

Extension before take-off, thus when the aircraft is on the ground, generates a small counter load in the actuator. An approximately constant torque is present, which is composed of the friction torques of the flap mechanism and the torque of the "drag brake" built into the no-back brake.

If the torque expected due to this is not measured, a faulty no-back brake is deduced.

If the aircraft is in the air, however, the torque values on retraction of the flap are checked for whether these lie within predetermined limits that differ from the limit values used when checking the aircraft on the ground. If this is not the case, and the torque values detected thus lie outside the acceptable range, a fault in the no-back brake is deduced, so that a servicing message or other message is output before the check ends.

Retraction of the flap following take-off takes place in the actuator with sequential load. In this case, thus on retraction of the flap in the air, this leads to an approximately constant torque, which is generated by the "drag brake" built into the no-back brake. Depending on the structural implementation of the no-back brake, air load components may be included.

It can accordingly be checked even during operation of the actuator, therefore, whether the no-back brake is functioning or not.

Moreover it is also possible to perform one or more of the test steps presented above over a longer operating period of the actuator or of the aircraft that has the actuator, in order to carry out so-called trend monitoring. The torques are thus measured at typically recurring characteristic operating states of the aircraft and evaluated over a plurality of operating cycles, which each have a sequence of characteristic operating states.

By comparing the values obtained over time, a prognosis can be produced that predicts a time of departure from a permitted tolerance range, so that a servicing signal can be output already in advance thereof, for example.

The invention claimed is:

1. Actuator system in an aircraft for monitoring a no-back brake, comprising: an actuator for actuating a flap of a flight control system of the aircraft, a first torque sensor for detecting a torque on the drive side of the actuator, and a second torque sensor for detecting a torque on the output side of the actuator, wherein the actuator is provided with an auto-switching no-back brake in order to hold a flap actuated by the actuator in position, wherein a monitoring unit, which is connected to the first torque sensor and the second torque sensor and is designed to detect an acute or imminent fault condition of the no-back brake depending on an actuator state and the detected torque values of the first torque sensor and the second torque sensor.

2. Actuator system according to claim 1, wherein the monitoring unit is further designed to deduce a functioning no-back brake if no torque is present at the first torque sensor when the actuator is not in operation, and to deduce a faulty no-back brake if a torque is present both at the first torque sensor and the second torque sensor when the actuator is not in operation.

3. Actuator system according to claim 1, wherein the monitoring unit is further designed to deduce a functioning no-back brake if a torque, which is below a predetermined first torque threshold value and/or exceeds a predetermined second torque threshold value, is present at the first torque sensor when the actuator is operating with a sequential load, and to deduce a faulty no-back brake if a torque proportional to the sequential load is present at the first torque sensor when the actuator is operating with a sequential load.

4. Actuator system according to claim 3, wherein the first torque threshold value is greater than the second torque threshold value and a torque value attributable to a drag brake built into the no-back brake is preferably located between the two torque threshold values.

5. Actuator system according to claim 1, wherein the monitoring unit is further designed to store torque values at characteristic operating states for each operating cycle of the aircraft and to undertake analysis of these torque values collected over several operating cycles, preferably in order to determine a prognosis of an imminent fault condition of the no-back brake on the basis of a trend.

6. Actuator system according to claim 5, wherein the characteristic operating states comprise at least one of the following operating states:
   a) Extension of a flap with the actuator before take-off of the aircraft with a low counter load,
   b) Retraction of a flap with the actuator following take-off of the aircraft with a sequential load,
   c) Extension of a flap with the actuator before landing of the aircraft with a counter load, and
   d) Retraction of a flap with the actuator following landing of the aircraft with a low sequential load.

7. Actuator system according to claim 5, wherein the monitoring unit is designed to average the torque values of the first torque sensor determined in a characteristic operating state and to use the averaged value for the analysis over several operating cycles.

8. Actuator system according to claim 1, wherein the monitoring unit is designed, in the case of an averaged torque value of the first torque sensor decreasing over several operating cycles in the operating state a), to detect a fault condition, in particular to detect a fault condition that indicates a deterioration in the braking capacity of a drag brake in the no-back brake.

9. Actuator system according to claim 7, wherein the monitoring unit is designed, in the case of an averaged torque value of the first torque sensor decreasing over several operating cycles in the operating state b), to detect a fault condition, in particular to detect a fault condition that indicates a deterioration in the braking capacity of the overall no-back brake.

10. Actuator system according to claim 5, wherein the monitoring unit is designed to produce a prognosis on the basis of the detected torque values of when deterioration of the no-back brake passes a critical threshold value.

11. Actuator system according to claim 1, wherein the flight control system of the aircraft is a high-lift system, a tail plane trim system and/or a thrust reversal system.

12. Actuator system according to claim 1, wherein the aircraft is a plane.

13. Method for monitoring a no-back brake of an actuator system in an aircraft according to claim 1.

14. Method according to claim 13, wherein the data of the torque values of the first torque sensor and the second torque sensor are stored by the monitoring unit, and are only read on completion of the operating cycle, preferably as part of ground servicing.

* * * * *